United States Patent
Eisermann

(10) Patent No.: US 8,617,690 B2
(45) Date of Patent: Dec. 31, 2013

(54) DIRECTLY LAMINATED PLATE

(75) Inventor: Ralf Eisermann, Cochern (DE)

(73) Assignee: Surface Technologies GmbH & Co. KG, Baruth (DE)

( * ) Notice: Subject to any disclaimer, the term of this patent is extended or adjusted under 35 U.S.C. 154(b) by 556 days.

(21) Appl. No.: 10/513,773

(22) PCT Filed: Apr. 11, 2003

(86) PCT No.: PCT/DE03/01207
§ 371 (c)(1),
(2), (4) Date: Sep. 14, 2005

(87) PCT Pub. No.: WO03/095202
PCT Pub. Date: Nov. 20, 2003

(65) Prior Publication Data
US 2007/0207296 A1    Sep. 6, 2007

(30) Foreign Application Priority Data
May 7, 2002   (DE) .................................. 102 20 501

(51) Int. Cl.
*B32B 7/10*     (2006.01)
*B44C 1/165*    (2006.01)

(52) U.S. Cl.
USPC ........ 428/200; 428/142; 428/151; 428/195.1; 428/220; 428/535

(58) Field of Classification Search
USPC .............. 428/15, 26, 200, 203, 211.1, 292.7, 428/326, 478.8; 156/209, 220
See application file for complete search history.

(56) References Cited

U.S. PATENT DOCUMENTS

| | | | | |
|---|---|---|---|---|
| 2,680,700 A | * | 6/1954 | Meyers | 428/215 |
| 3,106,500 A | * | 10/1963 | Turner | 156/91 |
| 3,373,068 A | * | 3/1968 | Grosheim et al. | 156/219 |
| 3,410,750 A | * | 11/1968 | Wohnsiedler | 428/530 |
| 4,093,766 A | | 6/1978 | Scher et al. | |
| 4,552,792 A | * | 11/1985 | Julian et al. | 428/42.2 |
| 5,422,168 A | * | 6/1995 | O'Dell et al. | 428/211.1 |
| 6,638,387 B2 | * | 10/2003 | Cruz | 156/219 |

FOREIGN PATENT DOCUMENTS

| | | |
|---|---|---|
| CN | 1124941 A | 6/1996 |
| CN | 1266400 A | 9/2000 |
| DE | 24 21 794 A1 | 4/1975 |
| DE | 25 01 625 B | 7/1976 |
| DE | 78 24 763 U1 | 11/1978 |
| DE | 2926983 | 1/1981 |
| DE | 199 63 084 A1 | 6/2001 |

(Continued)

OTHER PUBLICATIONS

Wilsonart(R) Flooring Fast Facts Sheet. Retrieved Dec. 17, 2008.*

(Continued)

*Primary Examiner* — Prashant J Khatri
(74) *Attorney, Agent, or Firm* — Senniger Powers LLP

(57) ABSTRACT

The invention relates to a directly laminated plate that is produced by heat pressing a core with absorbing, resin-impregnated layers, wherein at least one plate surface has a decorative layer with a graphic representation of the surface of an imitated material, in addition to a resin-impregnated, transparent cover layer place on the decorative layer, having a relief-like imitation of the surface structure of the imitated material. An intermediate ply containing resin is provided between the decorative layer and the core.

6 Claims, 2 Drawing Sheets

(56) References Cited

FOREIGN PATENT DOCUMENTS

| | | |
|---|---|---|
| DE | 100 14 567 A1 | 9/2001 |
| EP | 0031316 A1 | 7/1981 |
| EP | 0899092 A1 | 3/1999 |
| EP | 0959177 A2 * | 3/1999 |
| GB | 2088280 | 6/1982 |
| GB | 2088280 A * | 6/1982 |
| RU | 2048289 | 11/1995 |
| RU | 2055730 | 3/1996 |
| SU | 220480 | 1/1968 |
| SU | 1746873 | 7/1992 |
| WO | 9909274 | 2/1999 |
| WO | 03024715 | 3/2003 |

OTHER PUBLICATIONS

USDA FS-256. "The Southern Pines". Jul. 1985; pp. 1-11.*
Technisches Informationsblatt der Fa. Casco Nobel (Akzo Nobel) May 1996 D11 "Herstellung von Laminatfusboden durch Direktbeschichtung".
Abstract of CN1124941; Jun. 19, 1996.
Abstract of CN1266400; Sep. 13, 2000.

* cited by examiner

DIRECTLY LAMINATED PLATE

BACKGROUND OF THE INVENTION

1. Field of the Invention

The invention relates to a directly laminated plate or board that is produced by hot-pressing a core with absorbent, resin-impregnated layers, wherein at least one board surface has a decorative layer with a graphic representation of the surface of an imitated material, in addition to a resin-impregnated, transparent cover layer on said decorative layer.

2. Background of the Prior Art

Imitated materials include, for example, building materials, such as wood, ceramics, natural stone and artificial stone. The artificial image of such a material can portray details, such as a material surface in the treated state, like painted wood, or in the worn state with signs of wear, etc. In the text below, the abbreviation "DPL", which stands for "Direct Pressure Laminate", is used to refer to directly laminated boards of this kind. DPL boards are manufactured in what is known as a cycle press, in which the individual layers are placed loosely on top of one another and positioned such that the graphic representation and the structured press plate are exactly in line on top of one another before pressing takes place. This is the unique feature of boards of the type presented here. An attempt is made to match the graphic representation to the tactile properties of the board, such that it is recognizable to the user. Upon close examination of the board, the palpable structure of the surface more or less corresponds to the graphic representation.

The object of the invention is to design a directly laminated plate or board, which has a graphic representation of an imitated material corresponding to the relief-like reproduction of its surface, where the hot-pressing process has a gentle effect on the decorative layer.

SUMMARY OF THE INVENTION

According to the invention, the object is solved in that the decorative layer comprises paper which is not impregnated with resin and which is dry prior to hot-pressing, in that a resinous intermediate ply provided between the decorative layer and the core is produced prior to hot-pressing as a separate, prefabricated adhesive layer with impregnating resin, where the adhesive layer displays a matrix in which the impregnating resin is embedded, and in that the transparent cover layer is provided with a relief-like reproduction of the surface structure of the imitated material.

The resinous intermediate ply with the matrix is soft during hot-pressing and serves as a buffer into which the decorative paper is pressed. The decorative paper is no longer pressed on the hard surface of the core and crushed. In finished state, the decorative paper can be wavy. In this case, at the impressed points of the overlay, it dips somewhat deeper into the intermediate ply than at the points on either side of an impressed point. No crushing of the paper fibers occurs.

Because the intermediate ply is produced prior to hot-pressing, as a separate, prefabricated adhesive layer containing impregnating resin, this configuration offers advantages in terms of production engineering when large boards are to be manufactured. The adhesive layer can be impregnated by the same, known method as the overlay and decorative papers, whereas the coating of a core made of MDF, HDF, or particleboard is more complex as regards production engineering.

In order for the quantity of impregnating resin in the adhesive layer to be sufficient for bonding with the core, the adhesive layer contains excess resin. The excess amount is tailored to the absorbency of the respective core material. The less the core material is compressed, the higher the quantity of excess resin that must be selected. Therefore, a relatively large quantity of excess resin is required for a core material made of particleboard, which absorbs a large amount of resin in its open-fiber structure during hot-pressing.

Because the adhesive layer has a matrix in which the impregnating resin is embedded, the matrix can—depending on type—be provided with impregnating resin below its saturation point, or with an excess of impregnating resin that adheres to the surface of the saturated matrix. The matrix is preferably made of paper, because paper absorbs impregnating resin very well.

The decorative layer is preferably made of a cellulose material. Paper, in particular, can serve as the decorative layer, where the graphic representation of an imitated material is applied to the paper by means of a color printing process, for example. One key aspect of the invention is that no impregnating resin is applied to the cellulose material of the decorative layer prior to hot-pressing of the layers. According to the prior art, decorative paper is impregnated with excess resin. This means that the absorbent cellulose material reaches a degree of saturation equal to 100% of its absorbency, where an additional amount of impregnating resin is provided on at least one side of the layer. The latter is not embedded, but rather adheres to the cellulose material after being applied. The extensive saturation with hot, liquid resin causes the cellulose material to swell, this being manifested by the paper becoming longer and wider. According to the prior art, decorative papers that are impregnated are always used to manufacture directly laminated boards in which the graphic representation corresponds to the embossed surface structure.

The known decorative papers are provided with the graphic representation of the imitated material in a print shop. The print shop then delivers the decorative paper to a company that impregnates the printed paper with resin. Finally, the paper is delivered from there to the laminate manufacturer, who presses it into a board by the DPL method.

When applying the graphic representation, the printer absolutely must take into account the expected expansion of the cellulose material that is caused by impregnation with hot, liquid resin. In this context, the objective is, after the resin dries, to obtain a paper that, when it expands, corresponds to the size and pattern of the press plate of the DPL press, so that the graphic representation and the structure are not offset.

Because of the differing orientation of the cellulose fibers in the decorative paper, the lengthwise and widthwise expansion of the paper is not necessarily uniform. When printing the graphic representation, for example, it is assumed that the width increases by 1.6% and the length by 0.6%. Therefore, the print of the graphic representation is reduced in such a way that the paper, when expanded, reaches theoretical nominal dimensions corresponding to the dimensions of the press plate.

A number of factors are responsible for the expansion of the paper after impregnation, such as the quality of the cellulose, the processing method in the papermaking machine, the humidity during manufacture and storage, different dye liquors for printing the graphic representation, the quality of the impregnating resin, particularly its composition and the mixing ratio of water and hardener, the metering of the amount of impregnating resin in the impregnating machine, the additives used, such as fly ash, etc.

When processing the printing ink, there is seen to be a tendency for ink with low coverage, such as ink for printing a light-colored maple wood surface, to promote expansion, while dark printing ink with greater coverage, such as for printing a dark mahogany wood surface, reduces expansion. This is because the more opaque ink wears the cellulose surface more strongly and the hot, liquid resin is therefore not able to penetrate the cellulose material so much from the printed paper side.

In view of the numerous factors governing paper expansion, it is understandable that the printer's reduction of the graphic representation can only ever be an approximation of the target dimensions required to match the dimensions of the paper in its expanded state to the size of the press plate.

To reduce the effect of paper expansion, the invention abandons the impregnation of the decorative layer with excess resin. Instead, the quantity of impregnating resin selected is 0%. Since the objective is to reduce paper expansion, no impregnating resin is used. As a result, the cellulose material remains dry, meaning that the paper expands less than impregnated paper. An overlay impregnated with resin is provided on top of the decorative layer as a cover layer, and a resinous intermediate ply is provided under the decorative layer. During hot-pressing, a sufficient amount of resin must be present on the boundary surfaces between the layers in order to bond them together tightly and permanently.

A particularly important aspect of the present invention is the measure described above of using a decorative layer made of paper that is dry prior to hot-pressing and contains no impregnating resin whatsoever. This eliminates the effect of expansion due to the moisture of the hot, liquid resin. The paper need not be transported to an impregnating company, but rather can be delivered directly from the printer to the DPL press and processed into a laminated board. The problem of paper expansion in the making of the decorative layer is thus eliminated. The printer need no longer take resin-related expansion into account. The graphic representation of the imitated material can be printed directly in a size ratio of 1:1. The additional step of reducing the size of the graphic representation becomes superfluous.

The advantage of processing decorative layers with little or no expansion due to moisture is particularly important in the industrial-scale manufacture of directly laminated boards, because of the large dimensions of the presses used for laminating the layers. In the case of a very small press, e.g. with a length and width of one meter and paper expansion of 1.6%, deviations from the target expansion value are small and tolerable. However, in the case of a relatively large press, paper expansion of 1.6% causes a significantly greater deviation from the target value. As a result, large sections of a directly laminated board become scrap. Errors of this kind are all the more costly, because only whole boards can usually be sent on for further processing.

For further processing, the directly laminated boards are, for example, sawn into a number of panels that are processed into wall, floor, or ceiling coverings.

Apart from directly pressing the layers in a cycle press, joining layers in a continuous pressing process is another known method. In this case, the layers to be applied to the core are wound up and fed from rolls.

The solution according to the invention for avoiding paper expansion makes it possible to manufacture boards displaying a structured surface by a continuous pressing method, where the structure corresponds exactly to the graphic representation of an underlying decorative layer. In this context, the structure must be embossed by a roller in a rotary process. Even minimal paper expansion would be problematic in this process, because an error in lining up the graphic representation with the surface structure would persist as the process continues and worsen due to the continuous unwinding from the roll.

The various features of novelty that characterize the invention will be pointed out with particularity in the claims of this application.

BRIEF DESCRIPTION OF THE DRAWINGS

An example of the invention is illustrated in a drawing and described in detail below on the basis of FIGS. 1 and 2. The figures show the following.

DETAILED DESCRIPTION OF THE INVENTION

Figure 1:
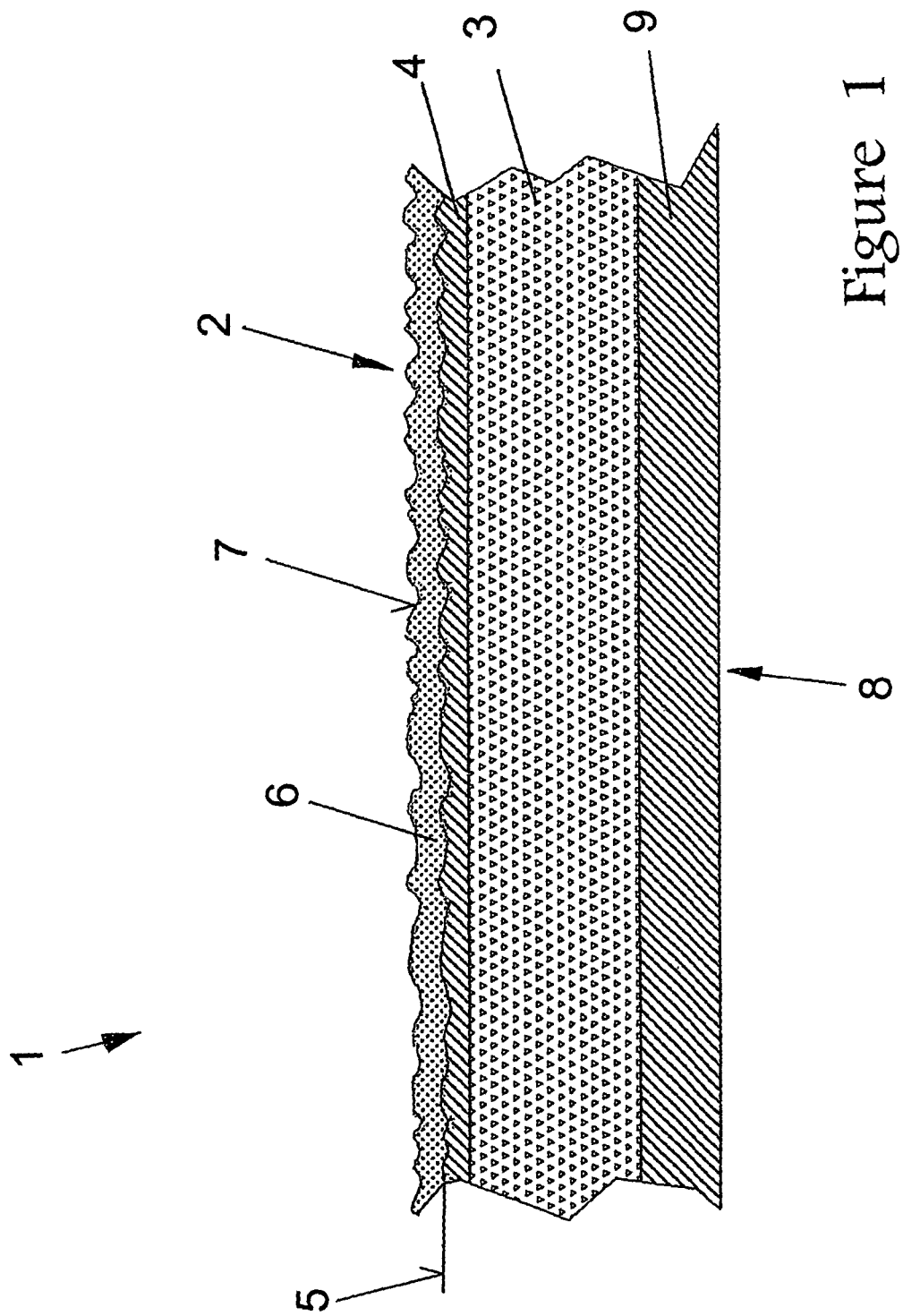
FIG. 1—A cross-section of a section of a directly laminated board.

Board 1 shown in FIG. 1 is a board 1 according to the prior art. Decorative layer 4 is applied to top side 2 of core 3 made of HDF material (high-density fiberboard). Decorative layer 4 has a graphic representation 5 of an imitated material. Decorative layer 4 is provided with cover layer 6 comprising an overlay impregnated with resin. Surface structure 7, which simulates the surface of the imitated material, is embossed on the overlay. The objective is to achieve an exact overlapping between graphic representation 5 of decorative layer 4 and the embossed surface structure 7 of cover layer 6. In this way, the optical impression of graphic representation 5 is intended to match the tactile impression of embossed surface structure 7.

According to the prior art, decorative layer 4 is made of printed paper, which is also impregnated with resin prior to hot-pressing. The decorative paper lies directly on core 3 of the board. On underside 8 of the board, which faces away from decorative layer 4, core 3 is provided with backing 9, also referred to as the "balancing backing". Backing 9 is likewise usually made of paper impregnated with resin. The thickness of the backing paper roughly corresponds to the sum of the thicknesses of decorative layer 4 and cover layer 6. Without backing 9, the laminated board 1 would warp due to the different tensions in core 3 and the layer structure (4, 6) during cooling.

According to the prior art shown in FIG. 1, the embossing of cover layer 6 causes virtually identical compression of decorative paper 4, namely on its printed side.

The cellulose fibers in decorative paper 4 are crushed and damaged. The quality of graphic representation 5 on the previously flat printed surface of the decorative paper is impaired by the deformation.

The prior art is furthermore associated with the problem of lining up graphic representation 5 of an imitated material with embossed surface structure 7. In this context, it is not a true alignment problem, but rather a dimension problem, because the expansion of impregnated decorative paper differs from one sheet of paper to another.

If a directly laminated board is not provided with an additional resinous layer between decorative layer 4 and core 3, the decorative paper itself must be impregnated with resin. The decorative paper must be impregnated with resin because a certain amount of the resin serves as an adhesive between the decorative paper and core 3 during hot-pressing, in order to ensure a tight and permanent bond between the layers.

Figure 2:
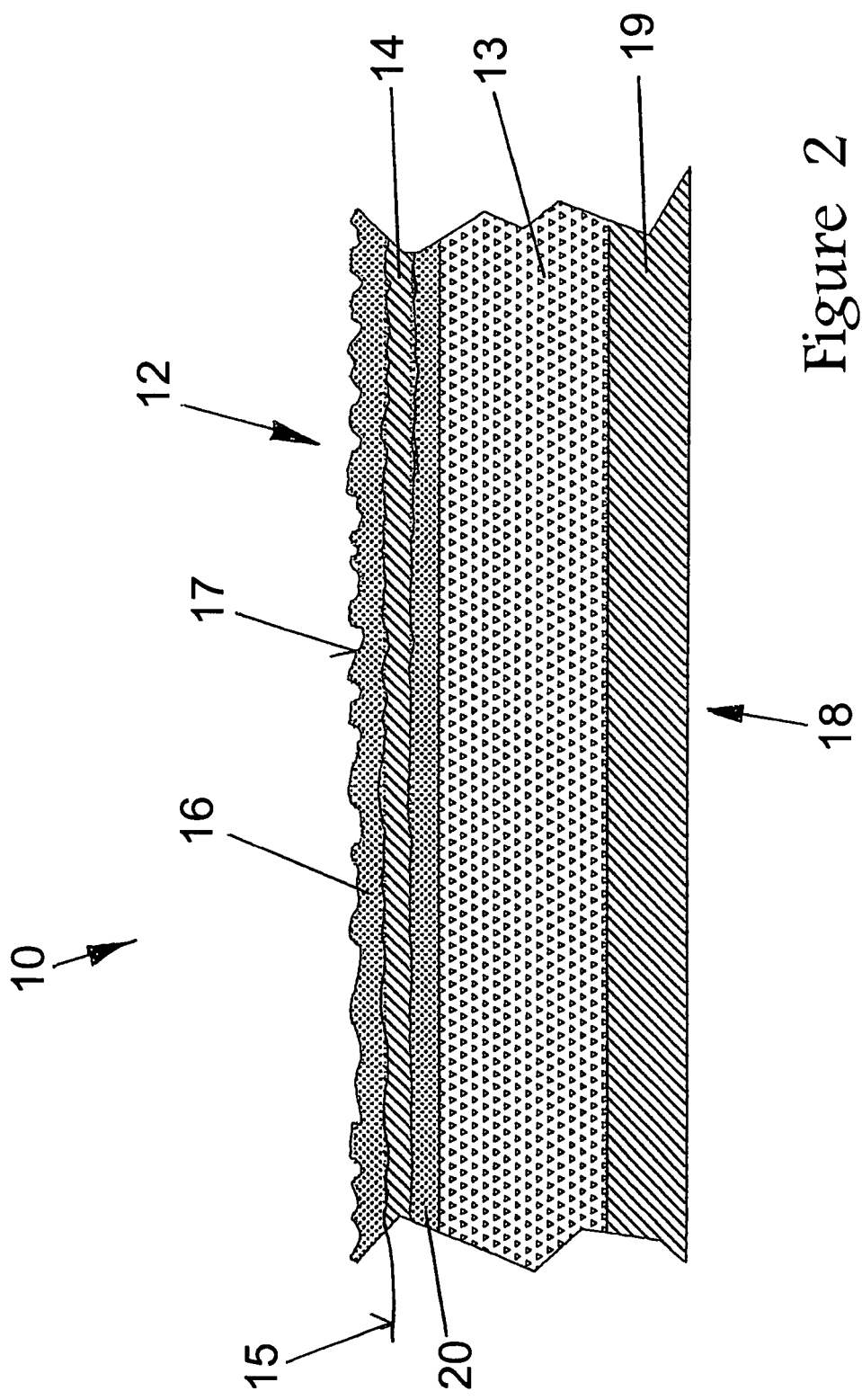
FIG. 2—A cross-section of a section of a directly laminated board according to the invention.

FIG. 2 shows a directly laminated board according to the invention, with a decorative layer 14 made of printed decorative paper. Graphic representation 15 on the decorative paper corresponds to surface structure 17 embossed on cover layer 16 positioned on top of decorative layer 14. The graphic representation of the image 15, and the roughness of surface structure 17 are imitations of a material surface, such as wood, ceramics, artificial stone, natural stone, etc.

In order to ensure gentle hot-pressing of decorative layer 14, a resinous intermediate ply 20 is provided between decorative layer 14 and cover 13. In the present configuration, intermediate ply 20 is, prior to hot-pressing, a separate, prefabricated adhesive layer 20 that is impregnated with resin.

Adhesive layer 20 displays a matrix in which the impregnating resin is embedded. The matrix is likewise made of paper. The resin content of the paper corresponds to the saturation point of the paper plus excess resin, which adheres to the surfaces of the paper. With this structure, adhesive layer 20 forms a reservoir with a sufficient amount of resin to bond the paper to core 13. The HDF material of core 13 absorbs some of the excess resin. The same applies to the other side of adhesive layer 20, which is joined to decorative paper 14. It also forms a reservoir for the purpose of bonding the adhesive-layer paper to decorative paper 14.

Decorative paper 14 according to FIG. 2 is a dry paper with no impregnating resin, and it displays great absorbency for the resin of adhesive layer 20. The excess resin of adhesive layer 20 is tailored to the absorbency of core 13 and dry decorative paper 14, and it ensures a tight and permanent bond between layers 13, 14, 16, and 20.

It can be seen in FIG. 2 that structure 20, embossed on the surface of cover layer 16, causes considerably less deformation on the printed side of decorative paper 14 than is the case with the prior art, shown in FIG. 1, because adhesive layer 20, located underneath decorative paper 14, is soft and flexible. At the deeply impressed points of cover layer 16, decorative paper 14 can dip down into adhesive layer 20 without being crushed against the hard surface of core 13. As a result, the hot-pressing process is gentle on decorative paper 14. The stability of decorative paper 14 and the quality of graphic representation 15 are preserved.

Using non-impregnated decorative paper 14, in accordance with the invention, eliminates the problem of applying to decorative paper 14, a colour print that has reduced dimensions and does not approximately reach the dimensions of the associated press plate until it expands.

To manufacture the directly laminated board according to the invention, a decorative paper 14 is used whose dimensions correspond 1:1 to the surface of an imitated material, without any size reduction. It exactly matches the dimensions of the corresponding press plate of a DPL press. All figures influencing the expansion of impregnated paper, as named above in the description of the invention, are thus eliminated. As a result, the invention simplifies the manufacture of such directly laminated boards, in which a graphic representation 15 is aligned with a surface structure 17.

On underside 18 of core 13, the side opposite the decorative layer, the board shown in FIG. 2 also has a backing 19 made of paper impregnated with resin, the thickness of which roughly corresponds to the total thickness of layers 14, 16, and 20 on the top side of core 13, in order to balance the tension forces on both sides of core 13 that occur during cooling of a freshly pressed board.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

LIST OF REFERENCE NUMBERS

1 Plate or board
2 Top side
3 Core
4 Decorative layer/decorative paper
5 Graphic representation
6 Cover layer
7 Surface structure
8 Underside
9 Backing
10 Plate or board
12 Top side
13 Core
14 Decorative layer/decorative paper
15 Graphic representation
16 Cover layer
17 Surface structure
18 Underside
19 Backing
20 Intermediate ply/adhesive layer

What is claimed is:

1. A directly laminated board that is produced by hot-pressing, comprising:
   a core of wood material;
   a decorative layer on at least one surface of the core, the decorative layer having a graphic representation of a surface of an imitated material, the decorative layer further comprising paper that is not impregnated with resin and that is dry prior to hot-pressing;
   a resin-impregnated, transparent cover layer on said decorative layer, said transparent cover embossed with a relief reproduction which corresponds to the graphic representation of the surface structure of the imitated material; and
   a resinous soft and flexible intermediate ply adhesive layer between the decorative layer and the core, which allows for flexibility of the decorative layer so as to prevent crushing of the decorative layer by the core; the intermediate ply adhesive layer being produced prior to hot-pressing the board as a separate, prefabricated intermediate ply adhesive layer with impregnating resin, the intermediate ply adhesive layer comprises a matrix in which the impregnating resin is embedded;
   wherein the layers and the core are positioned on top of one another before pressing and then hot-pressed together in a single pressing so that the layers are bonded together and the relief-like representation on the transparent cover layer corresponds to the graphic representation of the surface structure of the imitated material with the resin of the intermediate ply ensuring that the core and the decorative layer are securely bonded to each other;
   wherein the intermediate ply adhesive layer is directly on the core material, the decorative layer is directly on the intermediate ply adhesive layer, and the resin-impregnated, transparent cover layer is directly on the decorative layer.

2. The directly laminated board of claim 1 wherein the matrix is made of paper.

3. The directly laminated board of claim 1 wherein the wood material of the core is particle board.

4. The directly laminated board of claim 3, wherein the particle board of the core is a high-density fiberboard material.

5. The directly laminated board of claim 1 further comprising a backing made of paper impregnated with resin on an underside of the core opposite the surface of the core on which is the decorative layer.

6. The directly laminated board of claim 1 wherein the backing on the underside of the core has a thickness corresponding to a total thickness of intermediate ply adhesive layer, the decorative layer, and the resin-impregnated, transparent cover layer.

* * * * *